US007954217B2

(12) United States Patent
Wu

(10) Patent No.: US 7,954,217 B2
(45) Date of Patent: Jun. 7, 2011

(54) SEAL RING DISMOUNTING DEVICE

(76) Inventor: Pi-Liang Wu, Taichung (TW)

( * ) Notice: Subject to any disclaimer, the term of this patent is extended or adjusted under 35 U.S.C. 154(b) by 533 days.

(21) Appl. No.: 12/213,603

(22) Filed: Jun. 23, 2008

(65) Prior Publication Data

US 2009/0235504 A1 Sep. 24, 2009

(30) Foreign Application Priority Data

Mar. 18, 2008 (TW) ................................ 97204610 U

(51) Int. Cl.
*B23P 19/02* (2006.01)

(52) U.S. Cl. ................. 29/235; 29/270; 254/28; 254/25

(58) Field of Classification Search .................... 29/235, 29/267, 270, 278; 254/25, 28, 129, 131
See application file for complete search history.

(56) References Cited

U.S. PATENT DOCUMENTS 3,908,438 A * 9/1975 Norden ........................... 72/458
4,211,446 A * 7/1980 Shultz, Sr. ....................... 294/26
6,108,882 A * 8/2000 Hodgson .......................... 29/227
6,397,447 B1 * 6/2002 Christopherson et al. ....... 29/235
6,471,186 B1 * 10/2002 Lawless ........................... 254/25
7,600,305 B2 * 10/2009 Ploeger et al. .................. 29/235
2009/0235504 A1 * 9/2009 Wu ................................. 29/235

* cited by examiner

*Primary Examiner* — Lee D Wilson

(57) ABSTRACT

A seal ring dismounting device includes a handle and a first section of a shank is connected to the handle, a second section is connected to the first section at an angle. The second section includes first teeth defined in a lower side thereof. An operation plate having hook portion is connected to the second section. A rod is connected to a U-shaped frame and includes second teeth which are engaged with the first teeth of the second section. A spring member is located between the frame and the second section so that when pushing the frame toward the second section, the rod is moved to disengage the second teeth from the first teeth such that the rod can be easily moved along the second section.

6 Claims, 6 Drawing Sheets

SEAL RING DISMOUNTING DEVICE

FIELD OF THE INVENTION

The present invention relates to a dismounting device for removing a seal ring on a shaft.

BACKGROUND OF THE INVENTION

A conventional dismounting device for removing a seal ring on a shaft is disclosed in US 2007/0006437A1 which is shown in FIGS. 1 and 2, the disclosed dismounting device includes a handle 1 and a shank 2 is connected to the handle 1, an operation plate and a rod 4 are connected to the shank 2. The shank 2 includes a first section 202 and a second section 204 which is connected to the first section 202 at an angle. The first section 202 is connected to the handle 1 and the rod 4 and the operation plate 3 are connected to the second section 204. The rod 4 is located between the operation plate 3 and the first section 202. The second section 204 extends through a hole 401 in the rod 4 so that the rod 4 is movably mounted to the second section 204, a positioning bolt 402 threadedly extends through the rod 4 and contacts against the second section 204 so as to position the rod 4.

As shown in FIGS. 3 and 4, when using the dismounting device, the operation plate 3 is inserted between the shaft 7 and the seal ring 8, the operation plate 3 has a hook portion at a distal end thereof so as to hook the seal ring 8. The user then loosens the positioning bolt 402 and moves the rod 4 along the second section 204 till the rod 4 is in contact with the end surface of the mechanical part 9 and performs as a fulcrum. The positioning bolt 402 is then rotated to contact against the second section 204. By pivoting the handle 1, the operation plate 3 pulls the seal ring 8 out from the shaft 7.

The adjustment of the rod 4 has to rotate the positioning bolt 402 and this obviously takes a lot of time.

The present invention intends to provide a seal ring dismounting device wherein the rod can be easily moved and positioned.

SUMMARY OF THE INVENTION

The present invention relates to a seal ring dismounting device which comprises a handle and a first section of a shank is connected to the handle and a second section is connected to the first section at an angle. The second section includes first teeth defined in a lower side thereof. An operation plate has a first end connected to the second section and a hook portion is formed on a second end of the operation plate. A rod is movably connected to the second section and a U-shaped frame is mounted to the second section and connected to the rod. The frame includes a horizontal portion and two sidewalls are connected on two sides of the horizontal portion. The second section is located between the horizontal portion and a first end of the rod. Second teeth are defined in the first end of the rod so as to be engaged with the first teeth. A spring member is located between the horizontal portion and the second section so as to pull the rod and engage the second teeth with the first teeth.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
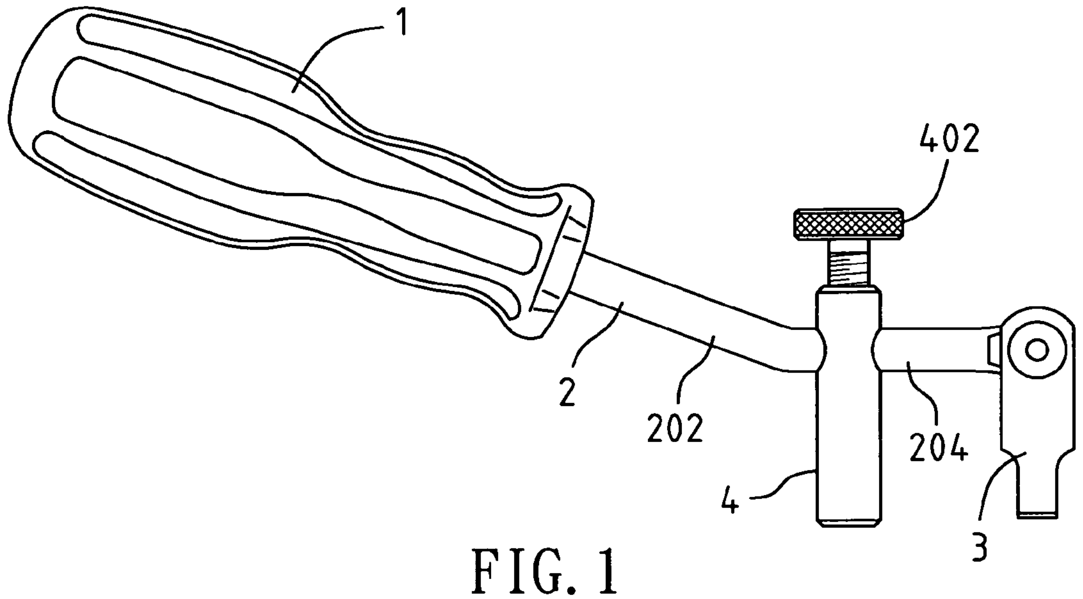
FIG. 1 PRIOR ART
FIG. 1 is a side view of a conventional seal ring dismounting device.
Figure 2:
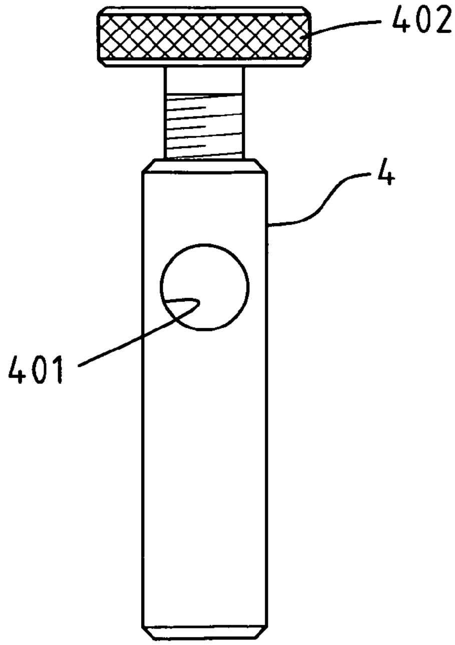
FIG. 2 PRIOR ART
FIG. 2 shows the rod and the positioning bolt of the conventional seal ring dismounting device.
Figure 3:
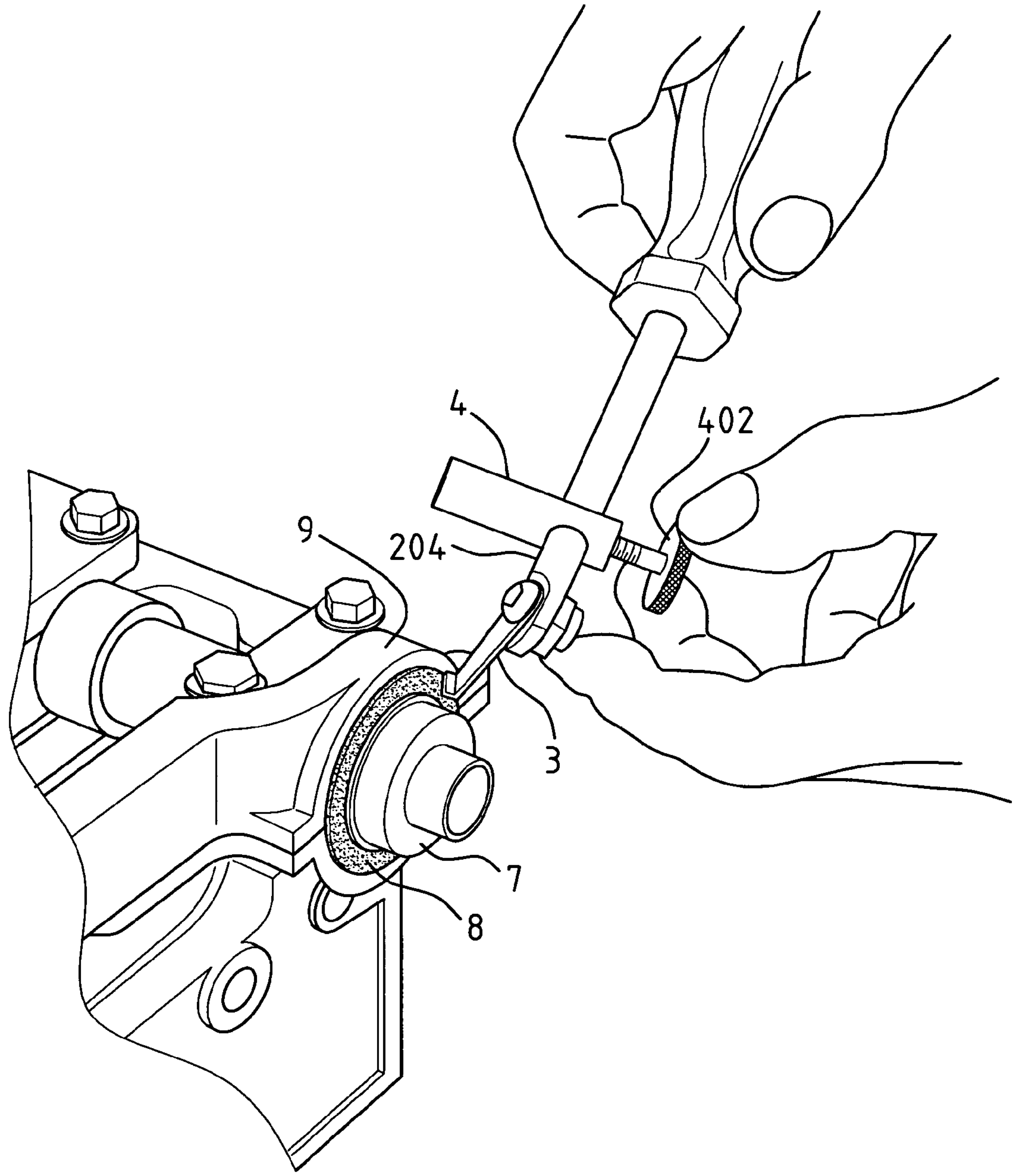
FIG. 3 PRIOR ART
FIG. 3 shows the conventional seal ring dismounting device is to be used to remove a seal ring on a shaft.
Figure 4:
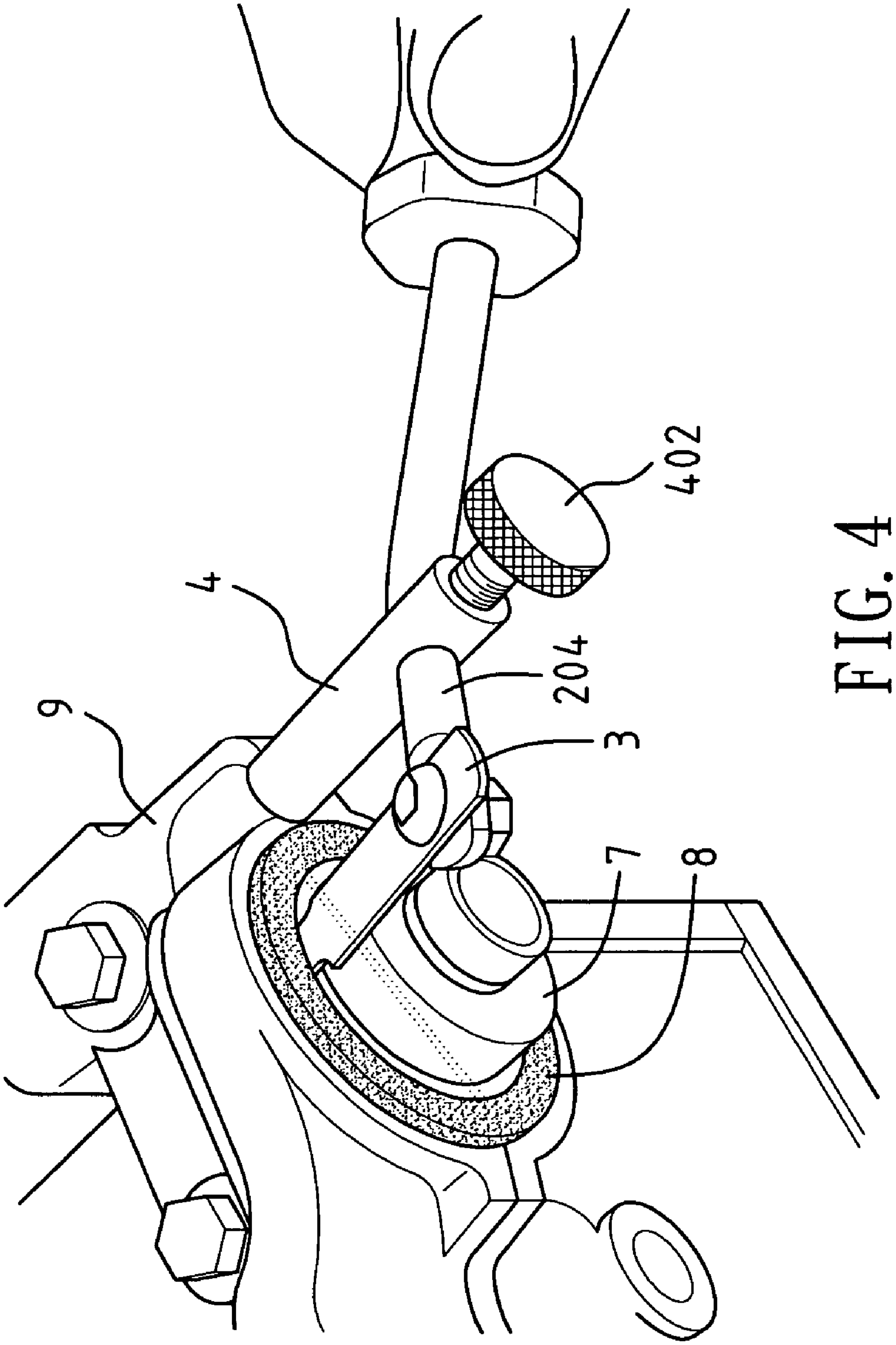
FIG. 4 PRIOR ART
FIG. 4 shows that the operation plate the conventional seal ring dismounting device is engaged with the seal ring and the rod is in contact with the mechanical part.
Figure 5:
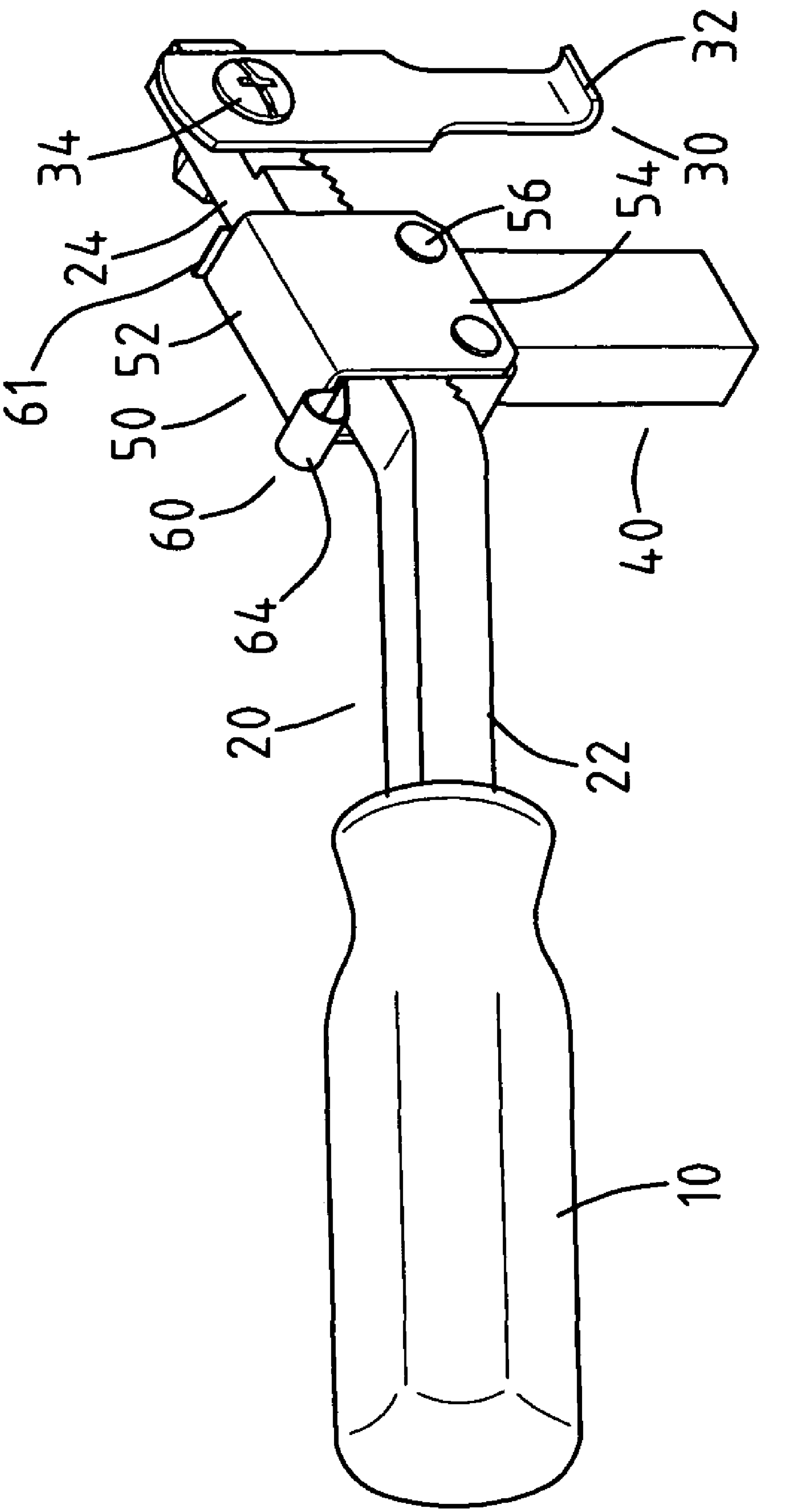
FIG. 5 is a perspective view to show the seal ring dismounting device of the present invention.
Figure 6:
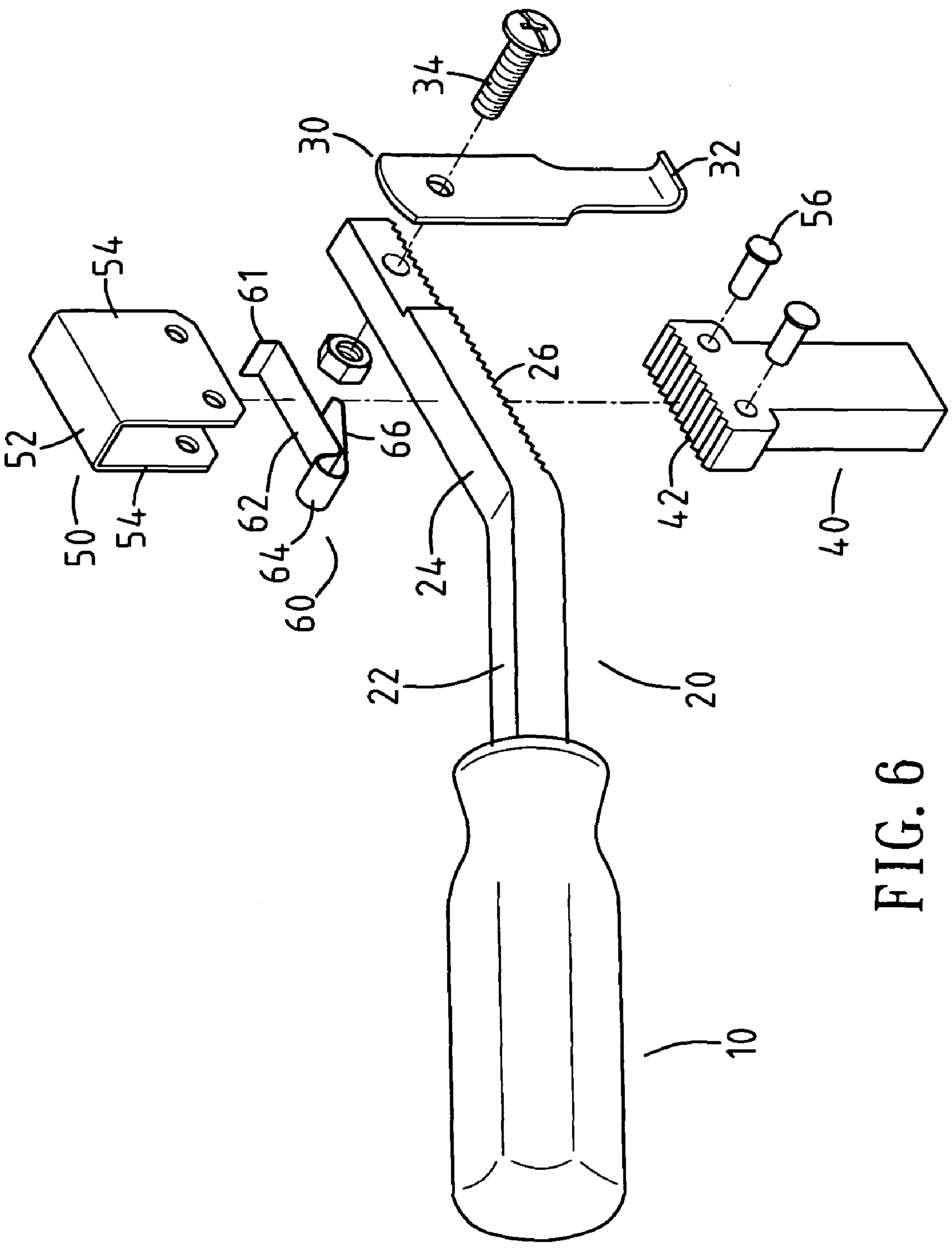
FIG. 6 is an exploded view to show the seal ring dismounting device of the present invention.
Figure 7:
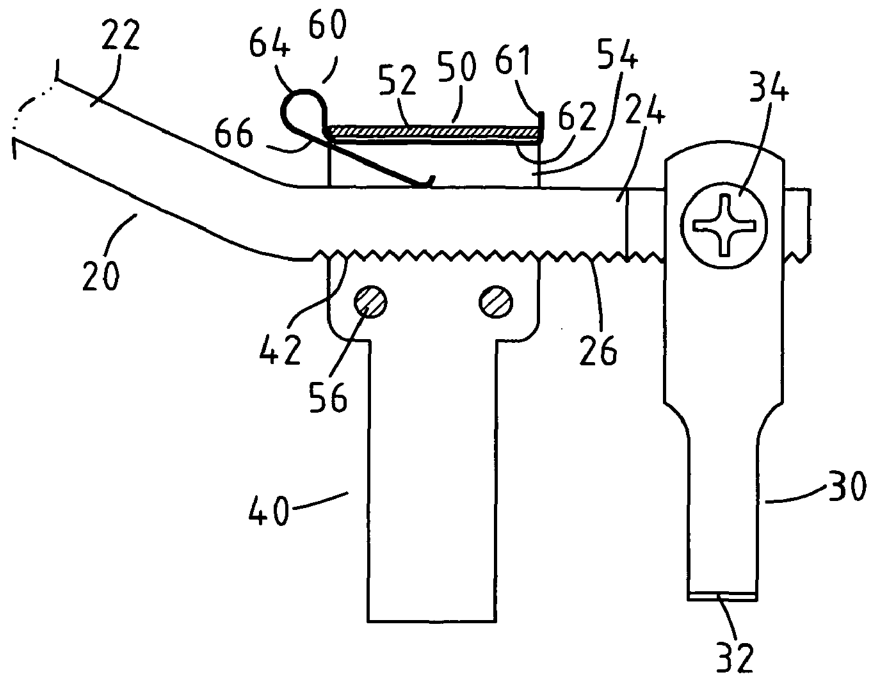
FIG. 7 shows that the first teeth of the second section of the shank are engaged with the second teeth of the rod of the seal ring dismounting device of the present invention.

Referring to FIGS. 5 to 7, the seal ring dismounting device of the present invention comprises a handle 10 and a first section 22 of a shank 20 is connected to the handle 10, a second section 24 of the shank 20 is connected to the first section 22 at an angle. The second section 24 includes first teeth 26 defined in a lower side thereof.

An operation plate 30 has a first end connected to a distal end of the second section 24 by a bolt 34 and a hook portion 32 is formed on a second end of the operation plate 30. A rod 40 is movably connected to the second section 24 by a U-shaped frame 50. The frame 50 includes a horizontal portion 52 and two sidewalls 54 are connected on two sides of the horizontal portion 52, the second section 24 is located between the horizontal portion 52 and a first end of the rod 40. Second teeth 42 are defined in the first end of the rod 40 so as to be engaged with the first teeth 26 of the second section 24. Two rivets 56 extend through the two sidewalls 54 and the rod 40 to connect the frame 50 to the second section 24.

A spring member 60 is located between the horizontal portion 52 and the second section 24 so as to lift the frame 50 together with the rod 40 upward and engage the second teeth 42 with the first teeth 26. The spring member 60 includes a contacting section 62, a curved section 64 and a biasing section 66, wherein the curved section 64 is connected between the contacting section 62 and the biasing section 66. The contacting section 62 contacts against an underside of the horizontal portion 52 of the frame 50 and the biasing section 66 contacts against the rod 40 at an angle, in this embodiment, the biasing section 66 contacts the second section 24 by a distal end thereof. The curved section 64 is located outside an end of the frame 50 and a stop 61 extends from a distal end of the contacting section 62, the stop 61 contacts an end of the frame 50 so as to position the spring member 60 to the frame 50.

Figure 8:
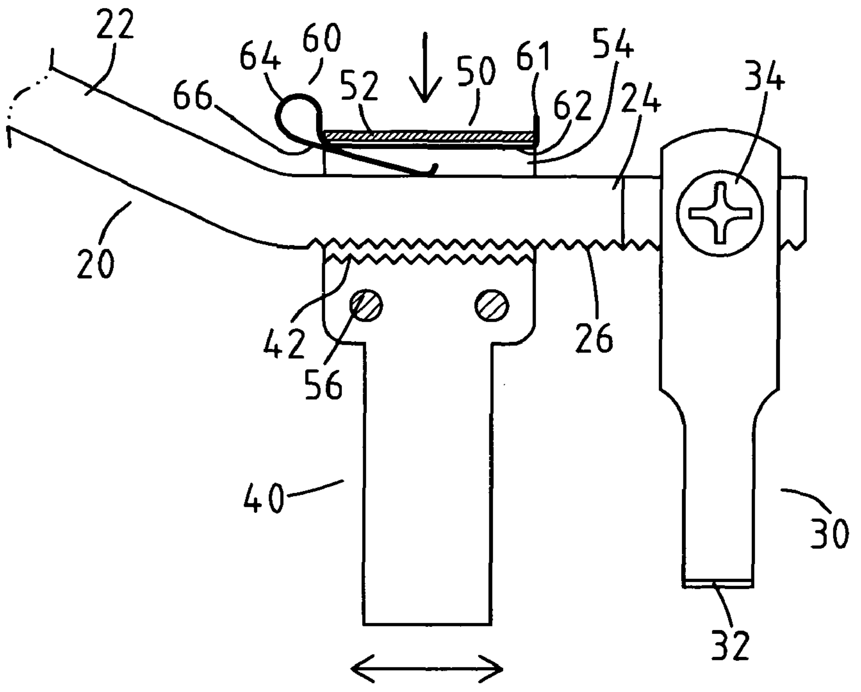
FIG. 8 shows that the first teeth of the second section of the shank are disengaged from the second teeth of the rod of the seal ring dismounting device of the present invention by pushing the frame downward.

As shown in FIG. 7, the spring member 60 biases the second section 24 so as to keep the first and second teeth 26 and 42 be engaged with each other. As shown in FIG. 8, when moving the rod 40, the user simply pushes the horizontal portion 52 toward the second section 24, the biasing section 66 is compressed by the second section 24 and the frame 50 together with the rod 40 are lowered to disengage the first teeth 26 from the second teeth 42. Therefore, the rod 40 can be moved along the second section 24. When releasing the spring member 60, the first teeth 42 are engaged with the first teeth 26 again to position the rod 40.

By this way, the user can quickly move and position the rod 40 at a desired position and save time.

While we have shown and described the embodiment in accordance with the present invention, it should be clear to those skilled in the art that further embodiments may be made without departing from the scope of the present invention.

What is claimed is:

1. A seal ring dismounting device comprising:

a handle;

a shank having a first section and a second section which is connected to the first section at an angle, the first section connected to the handle and the second section including first teeth defined in a lower side thereof;

an operation plate having a first end connected to the second section and a hook portion formed on a second end of the operation plate;

a rod movably connected to the second section and a U-shaped frame mounted to the second section and connected to the rod, the frame including a horizontal portion and two sidewalls are connected on two sides of the horizontal portion, the second section located between the horizontal portion and a first end of the rod, second teeth defined in the first end of the rod so as to be engaged with the first teeth, and a spring member located between the horizontal portion and the second section so as to lift the frame together with the rod upward and engage the second teeth with the first teeth.

2. The device as claimed in claim 1, wherein the spring member includes a contacting section, a curved section and a biasing section, the curved section is connected between the contacting section and the biasing section, the contacting section contacts against an underside of the horizontal portion of the frame and the biasing section contacts against the rod at an angle.

3. The device as claimed in claim 2, wherein the curved section is located outside an end of the frame and a stop extends from a distal end of the contacting section, the stop contacts an end of the frame.

4. The device as claimed in claim 2, wherein the biasing section contacts the second section by a distal end thereof.

5. The device as claimed in claim 1, wherein two rivets extend through the two sidewalls and the rod to connect the frame to the second section.

6. The device as claimed in claim 1, wherein the operation plate is connected to the second section by a bolt.

* * * * *